US011221125B2

(12) United States Patent
Gadegaard

(10) Patent No.: US 11,221,125 B2
(45) Date of Patent: Jan. 11, 2022

(54) COLOR CONTROL IN SUBTRACTIVE COLOR MIXING SYSTEM

(71) Applicant: Harman Professional Denmark ApS, Aarhus (DK)

(72) Inventor: Jesper Gadegaard, Tilst (DK)

(73) Assignee: Harman Professional Denmark ApS, Aarhus (DK)

(*) Notice: Subject to any disclaimer, the term of this patent is extended or adjusted under 35 U.S.C. 154(b) by 0 days.

(21) Appl. No.: 17/204,691

(22) Filed: Mar. 17, 2021

(65) Prior Publication Data
US 2021/0356095 A1    Nov. 18, 2021

(30) Foreign Application Priority Data

May 13, 2020 (EP) .................................... 20174358

(51) Int. Cl.
  *F21V 9/08* (2018.01)
  *F21V 23/04* (2006.01)
(52) U.S. Cl.
  CPC ............ *F21V 9/08* (2013.01); *F21V 23/0457* (2013.01)
(58) Field of Classification Search
  CPC ................................. F21V 23/045; F21V 9/08
  See application file for complete search history.

(56) References Cited

U.S. PATENT DOCUMENTS

| 6,533,439 | B1* | 3/2003 | Duflos | F21S 43/255 |
| | | | | 362/293 |
| 2001/0038452 | A1 | 11/2001 | Beaumont | |
| 2008/0103714 | A1 | 5/2008 | Aldrich et al. | |
| 2014/0175986 | A1 | 6/2014 | Adenau et al. | |
| 2019/0128507 | A1* | 5/2019 | Roy | G02F 1/133514 |

FOREIGN PATENT DOCUMENTS

| EP | 3418624 A1 | 12/2018 |
| WO | 2010145658 A1 | 12/2010 |

OTHER PUBLICATIONS

European Patent Office, Extended European Search Report Issued in Application No. 20174358.0, dated Nov. 3, 2020, Germany, 9 pages.

* cited by examiner

*Primary Examiner* — Anne M Hines
(74) *Attorney, Agent, or Firm* — McCoy Russell LLP

(57) ABSTRACT

Disclosed herein are methods for controlling a light fixture with a subtractive color mixing system for emitting light having a target color. The methods may comprise receiving target information indicative of, such as defining, the target color. The methods may further comprise calculating a target control setpoint for each of a the plurality of subtractive color filters based on: the target information; and calibration data, which for a plurality of sets of calibration control setpoints is indicative of an emitted color. The methods may further comprise controlling each of the subtractive color filters according to each calculated target control setpoint for each of the subtractive color filters.

19 Claims, 5 Drawing Sheets

COLOR CONTROL IN SUBTRACTIVE COLOR MIXING SYSTEM

CROSS REFERENCE TO RELATED APPLICATIONS

The present application claims priority to European Patent Application No. 20174358.0, entitled "COLOR CONTROL IN SUBTRACTIVE COLOR MIXING SYSTEM," and filed on May 13, 2020. The entire contents of the above-listed application is hereby incorporated by reference for all purposes.

TECHNICAL FIELD

The present invention relates to a method for controlling a light fixture, more particularly relates to a method for controlling a subtractive color mixing system of a light fixture based on calibration data, and furthermore relates to a corresponding control device, light fixture system and use thereof.

BACKGROUND

Light fixtures may be utilized for creating various light effects and/or mood lighting in connection with, e.g., concerts, live shows, TV shows, sport events or as architectural installation light fixtures creating various effects.

Light fixtures may be costly, imprecise in terms of emitted color and inconsistent, such as differing in properties (such as emitted color(s)) across different light fixtures.

Hence, an improved method for controlling a light fixture and more particularly a method for controlling a subtractive color mixing system of a light fixture, for enabling less costly light fixtures and/or for enabling increased consistency across light fixtures and a corresponding control device, light fixture system and use thereof, would be advantageous.

SUMMARY

It may be seen as an object of the present invention to provide a method for controlling a light fixture and a corresponding control device, light fixture system and use thereof for enabling less costly light fixtures and/or for enabling increased consistency across light fixtures. It is a further object of the present invention to provide an alternative to the prior art.

Thus, the above described object and several other objects are intended to be obtained in a first aspect of the invention by providing a method for controlling a light fixture with a subtractive color mixing system for emitting light having a target color, said method comprising: receiving target information indicative of, such as defining, the target color; calculating a target control setpoint for each subtractive color filter within the plurality of subtractive color filters based on: the target information; and calibration data, which for a plurality of sets of calibration control setpoints is indicative of an emitted color, and controlling each of the subtractive color filters according to each calculated target control setpoint for each of the subtractive color filters.

The invention may be particularly, but not exclusively, advantageous for taking into account calibration data, which can take into account non-linear characteristics of the color filters and/or deviations from nominal characteristics (i.e., being different from, e.g., characteristics provided or estimated by a manufacturer). This may in turn be advantageous for enabling utilizing relatively less costly color filters (and/or color filters less demanding to manufacture), where tolerances are relatively higher and where the characteristics consequently vary to a larger degree and still be able to emitting light with a color identical or relatively close to the target color. Another possible advantage may be that this may in turn enable emitting light with a color closer to the target color. Another possible advantage may be that this may in turn enable emitting light with a color closer to the target color, such as enabling increased consistency across light fixtures.

By "light fixture" is understood an electrical device that contains an (electrical) light source, such as an illumination system with a light source, that provides illumination and wherein the light source and optionally one or more optical components is at least partially enclosed in a housing. The person skilled in (entertainment) light fixtures realizes that a number of light effects can be integrated into the light fixture. According to embodiments, there is presented a light fixture with one or more of a prism for prism effects, an iris for iris effects, framing blades for framing effects, frost filter for frost effects, means for dimming effects, animation wheel for animation effects, one or more gobo wheels. The (entertainment) light fixture can be controlled based on an input signal indicative of light parameters which can be indicative of a target color indicating a decried color of the outgoing light, a number of light effect parameters indicative of a various numbers of light effects. The (entertainment) light fixture may comprise a processor configured to control the different light effects of the light fixture based on the light parameters received by the input signal. For instance the (entertainment) light fixture may comprise the light effects and be controlled based on various parameters as described in WO2010/145658 in particular on page 4 line 11-page 6 line 9.

By "light" is in the context of the present application generally understood visible electromagnetic radiation, such as electromagnetic radiation with wavelengths within (both endpoints included) 380-780 nm.

By "a subtractive color mixing system" is understood a system for partially or fully inhibiting conveying, such as transmitting (along the optical path) or reflecting (along the optical path), spectral parts of incident light, i.e., subtracting partially or fully one or more certain spectral parts (corresponding to the spectral parts not conveyed along the optical path). In embodiments, the one or more subtractions are realized by inserting, such as gradually inserting, one or more color filters into the optical path, such as wherein the subtractive color mixing system is arranged for inserting independently of each other three subtractive tristimulant color filters in varying degrees (such as the subtraction being in varying degrees, such as gradually increasing degrees) into the optical path. According to an embodiment, a filter set of three primary colors (with colors being the transmitted colors in case of incident white light) is arranged to perform such color mixing, such as red, green and blue color filters (RGB) or cyan, magenta and yellow color filters (CMY).

A further refinement may use a color temperature correction filter (CTC) in addition which can for example be used to vary the color temperature of white light output.

Theoretically, any color in the gamut can be produced by combining, e.g., the CMY filters to a varying degree. As an example, should a pale green color be desired, a combination of cyan and yellow filters would be used to partially cover the output from a white light source. The degree to which the aperture is partially filled by a particular filter (and thus the degree of paleness of the color attained) is the parameter known as the saturation. For example (theoretically) a fully saturated red would be achieved by the addition of fully saturated magenta in combination with fully saturated yellow. In practice due to the characteristics of dichroic filters, fully saturated colors are difficult to achieve by the addition of two subtractive color filters. In an embodiment, in addition to the color filters for subtractive color mixing, the light fixture comprises a conventional color wheel with, e.g., red, green and blue filters mounted thereupon to achieve full saturation of these colors.

By "gamut" is understood a subset of (all) colors which can be accurately represented in a given circumstance, such as within a given color space, such as with the substractive color mixing system.

In embodiments, the subtractive color mixing system comprises one or more dichroic filters. In high intensity light projectors such as are used for example in the entertainment and architectural lighting industries, the brightness of the light sources required is too high to use absorptive color filters for coloring the light beam. So called dichroic filters are used instead which reflect the complementary color of color passed through the filter. Such filters display an extremely small absorption and are able to withstand the high ambient temperature and high intensity light throughput which are characteristic of such projectors.

By "a target color" is understood a color which is to be targeted by the light fixture, such as a color desired by a user (such as the desired color defining a target color to be aimed at during control of the light fixture in pursuit of emission of a color similar or identical to the desired target color). The color may be defined with reference to a chromaticity and chromaticity (coordinate) system, such as the CIE (Commission internationale de l'eclairage) 1931 color space.

"Receiving target information" may include any form of user input, such as adjustment via physical controls, such as knobs or keyboards, or analog or digital signals, such as a digitally input chromaticity and chromaticity coordinate in the CIE 1931 color space.

By "target information indicative of the target color" may be understood that the target information enables deriving the target color, such as the target information defining directly the target color (e.g., target information being a coordinate in the CIE 1931 color space) or defining indirectly the target color (e.g., target information being a spectrum of electromagnetic radiation enabling deriving a corresponding target color).

By a "control setpoint" is understood a value set by a controller (where "controller" throughout the present text is used interchangeably with "control device") for controlling a color filter of the subtractive color mixing system, for example "+5 Volt" applied to an actuator controlling a position of a color filter in a feed-forward control scheme or "30 mm" in a feed-back control scheme.

By a "calibration control setpoint" is understood a control setpoint which has been used for calibration, such as control setpoints set by a control device during calibration for which a corresponding color of light emitted from the light fixture when each subtractive color filter is controlled according to the respective calibration control setpoint is measured and stored together with the calibration control setpoint.

A "set of control setpoints" may be understood to be a set of values for controlling a corresponding set of color filters.

By "calibration data" may be understood data, such as measured data, with corresponding values of on the one hand sets of control setpoints and on the other hand colors and/or spectra (of light emitted by the color mixing system). The calibration data may be non-linear, such as the relationship between on the one hand control setpoint and/or position of a filter and on the other hand color value being non-linear.

By "target control setpoint" is understood a value which should be targeted, e.g., by a control device, in pursuit of a target color.

In embodiments, the method may further comprise a step of optimization (such as fine tuning) subsequent to controlling each of the subtractive color filters according to each calculated target control setpoint for each of the subtractive color filters, such as for the purpose of reducing any difference in a color of light emitted by the light fixture and the target color.

According to an embodiment, there is presented a method wherein the method is further comprising: obtaining calibration data (such as repeatedly obtaining calibration data), wherein said obtaining calibration data comprises, for one or more sets of calibration control setpoints comprising a calibration control setpoint for each subtractive color filter, and wherein said obtaining calibration data comprises: controlling each subtractive color filter according to a respective calibration control setpoint; measuring color of light emitted from the light fixture when each subtractive color filter is controlled according to the respective calibration control setpoint; and storing corresponding values of: the set of calibration control setpoints; and the color of light emitted from the light fixture when each subtractive color filter is controlled according to the respective calibration control setpoint.

According to this embodiment, calibration data may be obtained by physically controlling, such as positioning, color filter(s) and measuring corresponding spectral information. The measurement setup could comprise an, optionally portable (such as comprising handles and/or shock-absorption elements and/or features for changing a size, such as features for reversibly disassembling and reassembling), integrating sphere and a spectrometer. An advantage of this embodiment may be that it ensures taking into account the true characteristics of color filter(s) alone or in combination and/or of a lamp of the light fixture for providing incident light to the subtractive color mixing system. Another possible advantage may be that obtaining calibration data can be used for updating calibration data, which may be relevant, e.g., due to drift or exchange of parts. According to this embodiment, color of emitted light is determined and stored, such as stored in the light fixture, e.g., in a electronically readable memory unit in the light fixture.

The above mentioned step of obtaining calibration data may be carried out as an embodiment of the invention and/or as a separate independent step.

By "measuring color of light emitted from the light fixture when each subtractive color filter is controlled according to the respective calibration control setpoint" may be understood measuring color (directly) with a color meter (such as in a point or with an integrating sphere).

By "measuring color of light emitted from the light fixture when each subtractive color filter is controlled according to the respective calibration control setpoint" may alternatively be understood measuring color (indirectly) by: measuring spectral information (such as with a spectrometer, such as in a point or with an integrating sphere.) of light emitted from the light fixture when each subtractive color filter is controlled according to the respective calibration control setpoint; and determining based on the spectral information a color of light emitted from the light fixture when each subtractive color filter is controlled according to the respective calibration control setpoint.

In any case, the embodiment may comprise measuring color (directly) and storing color or measuring color (indirectly) by measuring spectral information and storing (calculated) color and/or spectral information.

According to an embodiment, there is presented a method wherein the method is further comprising: obtaining calibration data (such as repeatedly obtaining calibration data), wherein said obtaining calibration data comprises, for one or more sets of calibration control setpoints comprising a calibration control setpoint for each subtractive color filter, and wherein said obtaining calibration data comprises: controlling each subtractive color filter according to a respective calibration control setpoint; measuring spectral information of light emitted from the light fixture when each subtractive color filter is controlled according to the respective calibration control setpoint; and storing corresponding values of: the set of calibration control setpoints; and the spectral information of light emitted from the light fixture when each subtractive color filter is controlled according to the respective calibration control setpoint.

This embodiment may be considered similar to the preceding embodiment, albeit the spectral information rather than colors is stored, and the same advantages may apply. It may be combined with the preceding embodiment so that both colors and spectral information is stored. An advantage of storing spectral information may be that it enables exchanging parts, such as one or more color filters and/or a lamp for providing incident light, while still being able to benefit from the knowledge of the characteristics of the remaining parts for which spectral information has been obtained and stored.

The above mentioned step of obtaining calibration data may be carried out as an embodiment of the invention and/or as a separate independent step.

According to an embodiment, there is presented a method, wherein the calibration data comprises a number N of sets of calibration control setpoints being 1 or more.

According to an embodiment, there is presented a method, wherein the calibration data comprises a number N of sets of calibration control setpoints (such as each calibration control set point being associated with a different color point than the other calibration control setpoint(s)) being 2 or more, such as 3 or more, such as 4 or more, such as 5 or more, such as 6 or more, such as 8 or more, such as 10 or more, such as 30 or more, such as 100 or more, such as 200 or more, such as 300 or more, such as 500 or more, such as 750 or more, such as 1000 or more. An advantage of using more points may be that it enables an improved resolution in a color space, such as so that a typical or maximum distance between a measured point and a target color becomes relatively smaller, such as improved resolution of the non-linearity to provide higher precision in a color space.

According to a further embodiment there is presented a method wherein the plurality of sets of calibration control setpoints comprises a set of calibration control setpoints, where each calibration control setpoint corresponds to substantially zero, such as zero, subtraction of light by the corresponding subtractive color filter. According to this embodiment, there may be substantially zero, such zero, subtraction from each filter, i.e., the corresponding data point is representative of the incident light, such as light from the light source or lamp of the light fixture This may allow for the data, such as the measurements, to be split into contributions coming from the light source and from the color filter(s).

According to another further embodiment there is presented a method wherein the plurality of sets of calibration control setpoints comprises, for each of a plurality of subtractive color filters, a set of calibration control setpoints where: the calibration control setpoint for the subtractive color filter corresponds to non-zero, such as substantial, subtraction of light; and the calibration control setpoint for all other subtractive color filters within the plurality of subtractive color filters corresponds to substantially zero, such as zero, subtraction of light.

According to this embodiment, there may be substantially zero, such zero, subtraction from all color filters, except one color filter, i.e., the corresponding data point is representative of the incident light and the influence of subtraction from only the one color filter. This may allow for these data, such as these measurements, to act as interface between different color gamut regions.

According to another further embodiment there is presented a method wherein the plurality of sets of calibration control setpoints comprises, one or more sets of mixed calibration control setpoints wherein a plurality, such as comprising of two or consisting of two, of calibration control setpoints each corresponds to non-zero, such as substantial, subtraction of light.

According to this embodiment, there may be substantially zero, such zero, subtraction from more than one, such as two, such as two and only two, color filters, i.e., the corresponding data point is representative of the incident light and the influence of subtraction from multiple, such as two and only two, color filters. This may be beneficial for improving resolution of calibration data points in a color space, which may in turn be beneficial for the possibility of accurately generating emitted light with having a (desired) target color, even if the target colors is not identical to a color of a calibration data point.

According to a further embodiment there is presented a method wherein the plurality of sets of calibration control setpoints comprises a plurality of mixed calibration control setpoints wherein a plurality, such as comprising of two or consisting of two, of calibration control setpoints each corresponds to non-zero, such as substantial, subtraction of light; and wherein corresponding colors of light emitted from the light fixture according to the plurality of sets of mixed calibration control setpoints have different distances in a color space, such as the CIE 1931 color space, with respect to a color for which each setpoint corresponds to substantially zero, such as zero, subtraction of light by the corresponding subtractive color filter.

According to this embodiment, the calibration data may comprise a plurality of mixed calibration control setpoints, where multiple, such as two and only two, color filters are inserted into the optical path, and wherein the resulting colors have color points with different distances with respect to the color point of the light source (with no color filters inserted). An advantage of this may be that it may be beneficial for improving resolution of calibration color points in a color space.

According to a further embodiment there is presented a method wherein for the sets of mixed calibration control setpoints with corresponding emitted colors at different distances in a color space, the same two calibration control setpoints are non-zero, such as where only these two calibration control setpoints are non-zero. According to this embodiment, the resulting colors having different distances from the color point of the light source (with no color filters inserted) are placed in a color space, such as the CIE 1931 color space, between lines drawn between points with only one color filter inserted in the optical path. An advantage of this may be that it may be beneficial for improving resolution of calibration data points in a color space.

According to an embodiment, there is presented a method wherein calculating the target control setpoint for each subtractive color filter within the plurality of subtractive color filters comprises interpolating between sets of calibration control setpoints. By "interpolating" may be understood estimating a target control setpoint for a target color from one or more control setpoints for colors on at least two sides of the target color in a color space, such as the CIE 1931 color space. An advantage of this may be that it enables estimating a target control setpoint even in the absence of a corresponding control setpoint in the calibration data.

According to an embodiment, there is presented a method comprising: point set mesh generation within a color space based on the calibration data, such as wherein calibration data points (such as color points corresponding to sets of calibration control setpoints) form vertices; determining a mesh polygon, such as the smallest mesh polygon, comprising the target color, such as by optionally repeatedly applying a method for determining if the target color is within a mesh polygon; and interpolating, such as interpolating within the mesh polygon based on the vertices of the mesh polygon, so as to achieve target control setpoints.

According to a further embodiment, the point set mesh generation is a point set triangulation.

According to a further embodiment, the point set mesh generation results in quadrilateral (four-sided) polygons. The math provides an analytical solution for a polygon with four points (e.g., for filters A and B and a quadrilateral polygon with the corners, A+B out, A in, B in, A+B in).

According to an alternative embodiment, there is presented a method wherein calculating the target control setpoint for each subtractive color filter within the plurality of subtractive color filters comprises a meshfree method. By "meshfree method" is understood a method that does not require connection between nodes of the simulation domain, i.e. a mesh, but is, e.g., based on interaction of each node with some or all of its neighbors, such as using a nearest neighbour interpolation and or using smoothed-particle hydrodynamics (SPH).

According to a second aspect of the invention, there is presented a control device for controlling a subtractive color mixing system of a light fixture, wherein the subtractive color mixing system comprises a plurality of adjustable subtractive color filters, and wherein the control device is arranged for: receiving target information indicative of, such as defining, the target color; calculating a target control setpoint for each subtractive color filter within the plurality of subtractive color filters based on: the target information; and calibration data, which for a plurality of sets of calibration control setpoints is indicative of an emitted color, and outputting calculated target control setpoints enabling controlling each of the subtractive color filters according to each calculated target control setpoint for each of the subtractive color filters.

The control device is may be operationally connected and optionally physically connected (such as within a light fixture) with the subtractive color mixing system. The control device may be embedded electronics, such as processor and memory and input/output (IO) system(s).

According to an embodiment, there is presented a control device further comprising or being operationally connected to a storage unit and comprising information corresponding to the calibration data.

The storage unit may be a unit comprising a suitable medium, such as a computer readable medium, such as an electronically accessible memory integrated circuit chip, such as an optical storage medium or a solid-state medium, such as an optical storage medium or a solid-state medium supplied together with or as part of other hardware, such as a Hard Disk Drive (HDD).

According to a third aspect there is presented a light fixture system comprising: a light fixture comprising: a light source; a subtractive color mixing system, wherein the subtractive color mixing system comprises a transducer for controlling the subtractive color filters upon receipt of target control setpoints; and a control device according to the second aspect, wherein the control device is operationally connected to the subtractive color mixing system and arranged for controlling the subtractive color mixing system by outputting calculated target control setpoints to the transducer controlling respective subtractive color filters.

According to an embodiment there is presented multiple light fixture systems, wherein calibration data differs between one or more pairs of light fixture systems.

According to an embodiment there is presented a light fixture system is further comprising: a color meter or a spectrometer, wherein the light fixture is arranged for emitting light to the color meter or the spectrometer; (said color meter or spectrometer optionally comprising) an integrating sphere, wherein the light fixture is arranged for emitting light into an input port of the integrating sphere, such as wherein the emitted light is emitted to the color meter or the spectrometer via the integrating sphere, and wherein the control device is further arranged for, such as arranged for in a calibration mode, obtaining calibration data, wherein said obtaining calibration data comprises, for one or more sets of calibration control setpoints comprising a calibration control setpoint for each subtractive color filter; controlling each subtractive color filter according to a respective calibration control setpoint; measuring with the color meter or spectrometer, respectively, a color (such as measuring the color directly with the color meter or indirectly via the spectrum of the spectrometer from which a color is calculated) or spectral information of light emitted from the light fixture when each subtractive color filter is controlled according to the respective calibration control setpoint; and storing corresponding values of: the calibration set of control setpoints; and the color (such as the color from the color meter or the color as calculated from the spectral information from the spectrometer) and/or spectral information of light emitted from the light fixture when each subtractive color filter is controlled according to the set of calibration control setpoints.

According to an embodiment, the light fixture system is arranged for obtaining calibration data repeatedly, such as for the purpose of continuously updating (and/or improving resolution).

There is also presented a calibration setup comprising: a color meter or a spectrometer, wherein the light fixture is arranged for emitting light to the color meter or the spectrometer; (said color meter or spectrometer optionally comprising) an integrating sphere, wherein the light fixture is arranged for emitting light into an input port of the integrating sphere, such as wherein the emitted light is emitted to the color meter or the spectrometer via the integrating sphere; and a control device is further arranged for, such as arranged for in a calibration mode: controlling each subtractive color filter of an associated light fixture with a subtractive color mixing system, according to a respective calibration control setpoint; obtaining calibration data, wherein said obtaining calibration data comprises, for one or more sets of calibration control setpoints comprising a calibration control setpoint for each subtractive color filter; measuring with the color meter or spectrometer, respectively, a color (such as measuring the color directly with the color meter or indirectly via the spectrum of the spectrometer from which a color is calculated) or spectral information of light emitted from the light fixture when each subtractive color filter is controlled according to the respective calibration control setpoint; and storing corresponding values of: the calibration set of control setpoints; and the color (such as the color from the color meter or the color as calculated from the spectral information from the spectrometer) and/or spectral information of light emitted from the light fixture when each subtractive color filter is controlled according to the set of calibration control setpoints.

The color meter and/or the spectrometer may in embodiments be arranged external to the light fixture or internal to the light fixture (such as enclosed by a lamp housing). An advantage of placement external to the light fixture may be that it enables simple removal subsequent to use and/or lower weight and cost of the light fixture. An advantage of placement internal to the light fixture may be that it enables a compact and integrated solution for the purpose of calibrating the light fixture (including calibration during and after/between use(s)).

According to an embodiment, the method comprises measuring with the spectrometer spectral information of light emitted from the light fixture when each subtractive color filter is controlled according to the respective calibration control setpoint, and furthermore comprises determining based on the spectral information a color of light emitted from the light fixture when each subtractive color filter is controlled according to the respective calibration control setpoint, and still further comprises storing corresponding values of the calibration set of control setpoints, and the color (such as the color as calculated from the spectral information from the spectrometer) and/or spectral information of light emitted from the light fixture when each subtractive color filter is controlled according to the respective calibration control setpoint.

According to a fourth aspect, there is presented use of a light fixture system according to the third aspect for emitting a target color.

BRIEF DESCRIPTION OF THE DRAWINGS

The first, second, third and fourth aspect according to the invention will now be described in more detail with regard to the accompanying figures. The figures show one way of implementing the present invention and is not to be construed as being limiting to other possible embodiments falling within the scope of the attached claim set.

DETAILED DESCRIPTION

Figure 1:
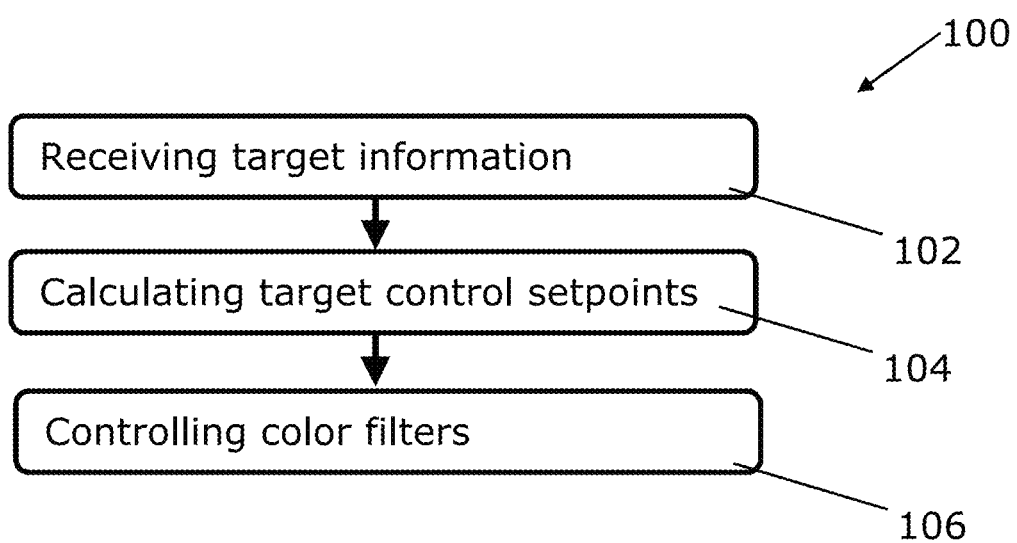
FIG. 1 shows a flow-chart of a method according to the invention.

FIG. 1 shows a flow-chart of a method 100 according to the invention for controlling a light fixture with a subtractive color mixing system for emitting light having a target color, said method comprising: receiving 102 target information indicative of, such as defining, the target color; calculating 104 a target control setpoint for each subtractive color filter within the plurality of subtractive color filters based on: the target information; and calibration data, which for a plurality of sets of control setpoints is indicative of an emitted color; and controlling 106 each of the subtractive color filters according to each calculated target control setpoint for each of the subtractive color filters.

Figure 2:
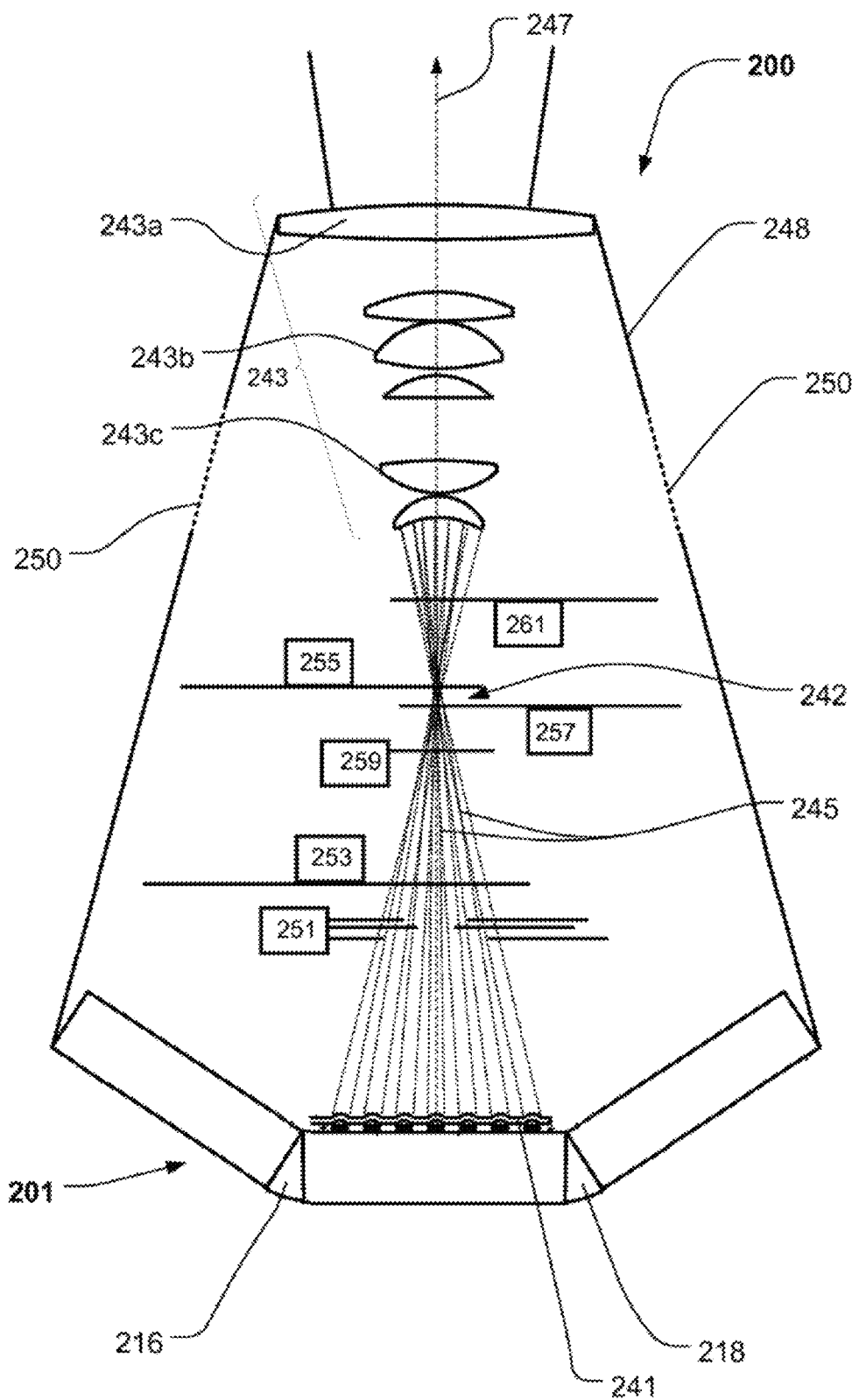
FIG. 2 illustrates a structural diagram of an illumination device.

FIG. 2 illustrates a structural diagram of an illumination device 200 (wherein "illumination device" and "light fixture" may be understood interchangeably throughout the present application). The illumination device comprises a cooling module 201 comprising a plurality of LEDs 103 (which could in an alternative embodiment be other light sources, such as one or more discharge bulbs), a light collector 241, an optical gate 242 and an optical projecting and zoom system 243. The cooling module is arranged in the bottom part of a lamp housing 248 of the illumination device and the other components are arranged inside the lamp housing 248. The lamp housing 248 can be provided with a number of openings 250. The light collector 241 is adapted to collect light from the LEDs 103 and to convert the collected light into a plurality of light beams 245 (dotted lines) propagating along an optical axis 247 (dash-dotted line). The light collector can be embodied as any optical means capable of collecting at least a part of the light emitted by the LEDs and convert the collected light to a light beams. In the illustrated embodiment the light collector comprises a number of lenslets each collecting light from one of the LEDs and converting the light into a corresponding light beam. However it is noticed that the light collector also can be embodied a single optical lens, a Fresnel lens, a number of TIR lenses (total reflection lenses), a number of light rods or combinations thereof. It is understood that light beams propagating along the optical axis contain rays of light propagating at an angle, e.g. an angle less than 45 degrees to the optical axis. The light collector may be configured to fill the optical the gate 242 with light from the LEDs 103 so that the area, i.e. the aperture, of the gate 242 is illuminated with a uniform intensity or optimized for max output. The gate 242 is arranged along the optical axis 247. The optical projecting system 243 may be configured to collect at least a part of the light beams transmitted through the gate 242 and to image the optical gate at a distance along the optical axis. For example, the optical projecting system 243 may be configured to image the gate 242 onto some object such as a screen, e.g. a screen on a concert stage. A certain image, e.g. some opaque pattern provided on a transparent window, an open pattern in a non-transparent material, or imaging object such as GOBOs known in the field of entertainment lighting, may be contained within the gate 242 so that that the illuminated image can be imaged by the optical projecting system. Accordingly, the illumination device 200 may be used for entertainment lighting. In the illustrated embodiment the light is directed along the optical axis 247 by the light collector 241 and passes through a number of light effects before exiting the illumination device through a front lens 243a. The light effects can for instance be any light effects known in the art of intelligent/entertainments lighting for instance, a CMY subtractive color mixing system 251, color filters 253, gobos 255, animation effects 257, iris effects 259, a focus lens group 243c, zoom lens group 243b, prism effect 261, framing effects (not shown), or any other light effects known in the art. The mentioned light effects only serves to illustrate the principles of an illuminating device for entertainment lighting and the person skilled in the art of entertainment lighting will be able to construct other variations with additional are less light effects. Further it is noticed that the order and positions of the light effects can be changed.

Figure 3:
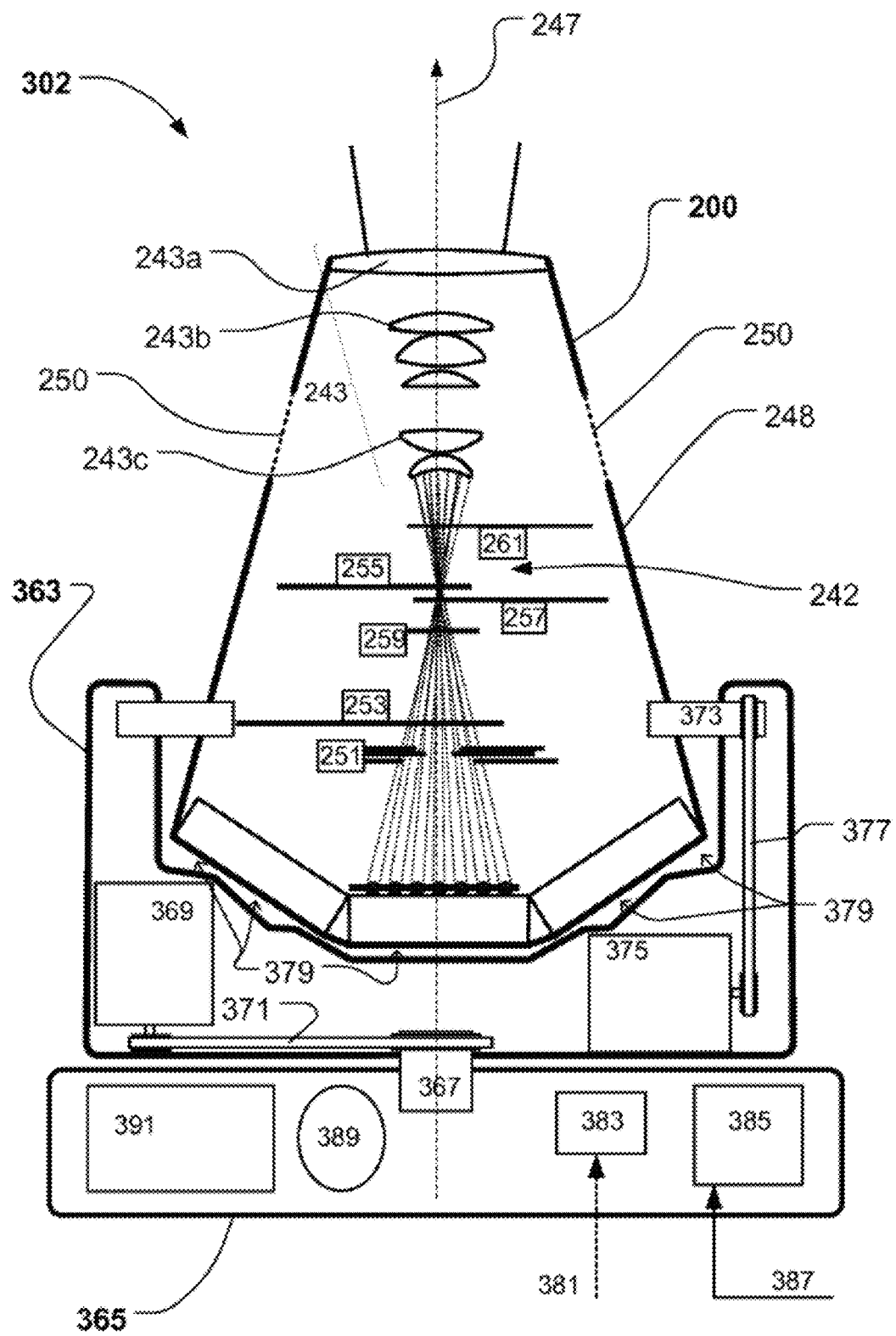
FIG. 3 illustrates a structural diagram of a moving head light fixture.

FIG. 3 illustrates a structural diagram of a moving head light fixture 302 comprising a head 200 rotatable connected to a yoke 363 where the yoke is rotatable connected to a base 365. The head is substantially identical to the illumination device shown in FIG. 2 and substantial identical features are labeled with the same reference numbers as in FIG. 2 and will not be described further. The moving head light fixture comprises pan rotating means for rotating the yoke in relation to the base, for instance by rotating a pan shaft 367 connected to the yoke and arranged in a bearing (not shown) in the base). A pan motor 369 is connected to the shaft 367 through a pan belt 371 and is configured to rotate the shaft and yoke in relation to the base through the pan belt. The moving head light fixture comprises tilt rotating means for rotating the head in relation to the yoke, for instance by rotating a tilt shaft 373 connected to the head and arranged in a bearing (not shown) in the yoke). A tilt motor 375 is connected to the tilt shaft 373 through a tilt belt 377 and is configured to rotate the shaft and head in relation to the yoke through the tilt belt. The skilled person will realize that the pan and tilt rotation means can be constructed in many different ways using mechanical components such as motors, shafts, gears, cables, chains, transmission systems, bearings etc. Alternatively it is noticed that it also is possible to arrange the pan motor in the base and/or arrange the tilt motor in the head. A space 379 between the yoke and the bottom part of the head is limited as the moving head light fixture is designed to be as small as possible. As known in the prior art the moving head light fixture receives electrical power 381 from an external power supply (not shown). The electrical power is received by an internal power supply 383 which adapts and distributes electrical power through internal power lines (not shown) to the subsystems of the moving head. The internal power system can be constructed in many different ways for instance by connecting all subsystems to the same power line. The skilled person will however realize that some of the subsystems in the moving head need different kind of power and that a ground line also can be used. The light source will for instance in most applications need a different kind of power than step motors and driver circuits. The light fixture comprises also a controller 385 which controls the components (other subsystems) in the light fixture based on an input signal 387 indicative light effect parameters, position parameters and other parameters related to the moving head light fixture. The controller receives the input signal from a light controller (not shown) as known in the art of intelligent and entertainment lighting for instance by using a standard protocol like DMX, Art-NET, RDM etc. Typically the light effect parameter is indicative of at least one light effect parameter related to the different light effects in the light system. The controller 385 is adapted to send commands and instructions to the different subsystems of the moving head through internal communication lines (not shown). The internal communication system can be based on a various type of communications networks/systems. The moving head can also comprise user input means enabling a user to interact directly with the moving head instead of using a light controller to communicate with the moving head. The user input means 389 can for instance be bottoms, joysticks, touch pads, keyboard, mouse etc. The user input means can also be supported by a display 391 enabling the user to interact with the moving head through a menu system shown on the display using the user input means. The display device and user input means can in one embodiment also be integrated as a touch screen.

Figure 4:
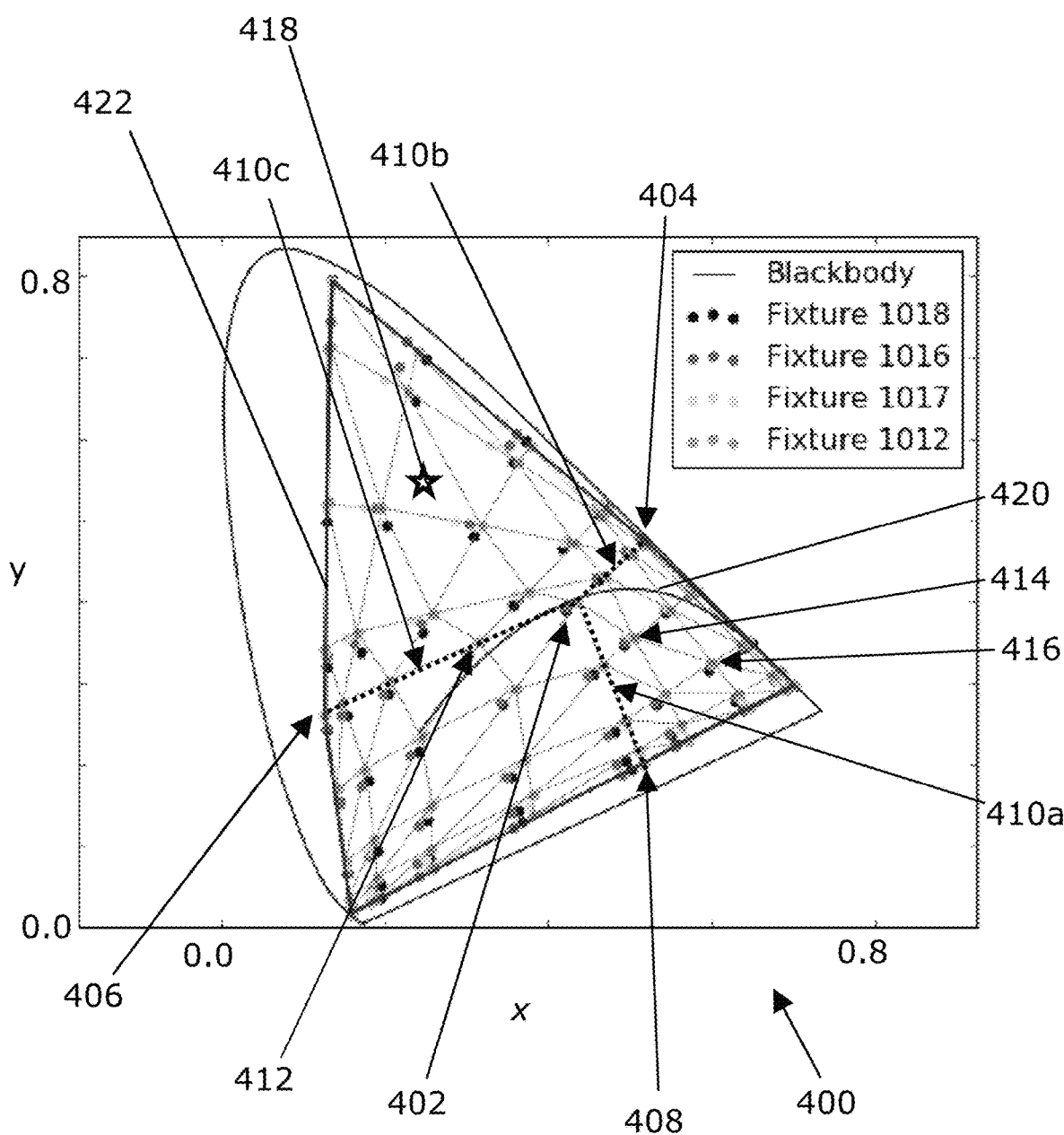
FIG. 4 shows a triangulated point set of color points in a calibration data set.

FIG. 4 shows a triangulated point set 400 (of color points in a calibration data set) in a CIE 1931 color space with a plurality of points of a set of calibration data, each point being representative of a color of light emitted from a (one of four) light fixtures (the light fixtures being named "Fixture 1018," "Fixture 1016," "Fixture 1017" and "Fixture 1012," cf., the legend in the figure) when each subtractive color filter in the light fixture is controlled according to a respective calibration control setpoint. FIG. 4 also shows a black body line 420 as a full drawn line. The achievable color gamut is defined by the outer edges of the measured points, shown as a thick fully drawn line 422.

Furthermore, point set mesh generation within the color space has been carried out for one fixture ("Fixture 1012") based on the calibration data, such as wherein calibration data points form vertices, wherein the point set mesh generation is a point set triangulation.

For example, the subtractive color mixing system may comprise three color filters, and the point mesh generation is triangulation wherein any mesh polygon comprise vertices which have no more than two filters inserted in the optical path. FIG. 4 depicts such embodiment, wherein a subtractive CMY (cyan, magenta, yellow) color mixing system has been calibrated (for four light fixtures) to give the depicted point sets, which have been triangulated. The calibration data of FIG. 4 comprises for each combination of two filters in the set of three filters (i.e., three combinations) any combination of 5 possible setting for each filter, i.e., the plurality of sets of calibration control setpoints comprises 75 sets (i.e., 3 combinations of two filters with 5 times 5 settings for each combination of filters, i.e., 3×5^2 sets). FIG. 4 shows a no-filter calibration control setpoint 402 where each calibration control setpoint corresponds to substantially zero, such as zero, subtraction of light by the corresponding subtractive color filter, which is effectively the color of the lamp of the light fixture, which in the present example lies on or near the black body line 420. The calibration data of FIG. 4 also comprises, for each of a plurality of subtractive color filters, sets of calibration control setpoint where the calibration control setpoint for the subtractive color filter corresponds to non-zero, such as substantial, subtraction of light, and the calibration control setpoint for all other subtractive color filters within the plurality of subtractive color filters corresponds to substantially zero, such as zero, subtraction of light, such as sets of calibration control setpoints with only one color filter fully inserted (such as inserted to the maximum extent possible in the specific implementation) in the optical path, such as a yellow-filter calibration control setpoint 404 (with only the yellow filter fully inserted), a cyan-filter calibration control setpoint 406 (with only the cyan filter fully inserted) and a magenta-filter calibration control setpoint 408 (with only the magenta filter fully inserted). Each dotted line 410a, 410b, 410c shows, respectively, a line in the color space corresponding to gradually increasing (away from the no-filter calibration control setpoint 402) insertion of a single color filter. FIG. 4 also shows color points corresponding to sets of mixed calibration control setpoints wherein a plurality of calibration control setpoints each corresponds to non-zero, such as substantial, subtraction of light, for example a first color point 414 and a second color point 416. Furthermore, the corresponding colors i.e., cf., first color point 414 and second color point 416, of light emitted from the light fixture according to the plurality of sets of mixed calibration control setpoints have different distances in a color space with respect to a color (cf., the no-filter color point 402) for which each setpoint corresponds to substantially zero, such as zero, subtraction of light by the corresponding subtractive color filter. In other words, the first color point 414 is closer to color point 402 compared to color point 416. Still further, for the sets of mixed calibration control setpoints with corresponding emitted colors at different distances in a color space, the same two calibration control setpoints are non-zero (such as for these two calibration control setpoints, the same two filters are inserted in the optical path), such as where only these two control calibration setpoints are non-zero, such as wherein the two corresponding color points 414, 416 are between the same two dotted lines, such as lines 410a, 410b.

FIG. 4 also shows an exemplary target color, as indicated by a star 418, which is not coinciding with a color of a set of calibration control setpoints (such as the star not coinciding with any rounded marker, but is rather within the triangles or on the edges between the rounded markers, and in this example being placed entirely within a triangle in the triangulated mesh).

According to an embodiment, calculating a target control setpoint for each subtractive color filter within the plurality of subtractive color filters based on the target information and calibration data which for a plurality of sets of calibration control setpoints is indicative of an emitted color, may comprise identifying the set of calibration control setpoints with a corresponding color being closest to the target color and setting the target control setpoint for each color filter as equal to the corresponding calibration control setpoint of said (nearest) set of calibration control setpoints. This may be advantageous for its simplicity (e.g., renders point mesh generation superfluous) and may in particular work well for high-resolution calibration data (such as calibration data with a high number of calibration control setpoints, which colors which are well-distributed in color space) and/or where requirements for (exact) color reproduction is relatively relaxed. In a further embodiment, calculating a target control setpoint for each subtractive color filter within the plurality of subtractive color filters based on the target information and calibration data which for a plurality of sets of calibration control setpoints is indicative of an emitted color, may comprise identifying the (plurality of) sets of calibration control setpoints with a corresponding color being closest (or nearest) to the target color and setting the target control setpoint for each color filter based on said (nearest) sets of calibration control setpoints, such as by relying on nearest-neighbour interpolation.

According to another embodiment, calculating a target control setpoint for each subtractive color filter within the plurality of subtractive color filters may comprise determining a mesh polygon (after point mesh generation), such as the smallest mesh polygon, comprising the target color, such as by optionally repeatedly applying a method for determining if the target color is within a mesh polygon. Once the (smallest) mesh polygon comprising the target color has been identified, the target control setpoints are identified by interpolating, such as performing linear triangle interpolation within the mesh polygon based on the vertices of the mesh polygon, so as to achieve target control setpoints. For example, each vertice may be associated with three scalar values, corresponding to the calibration control setpoint for each filter, and the a linear triangle interpolation may be carried out for the calibration control setpoint for each filter resulting in a set of target control setpoints with a target control setpoint for each filter.

According to a still further embodiment, the set of target control setpoints may be obtained by any means, e.g., non-linear interpolation, taking multiple points on either side into account, extrapolation by multiple points, etc.

Figure 5:
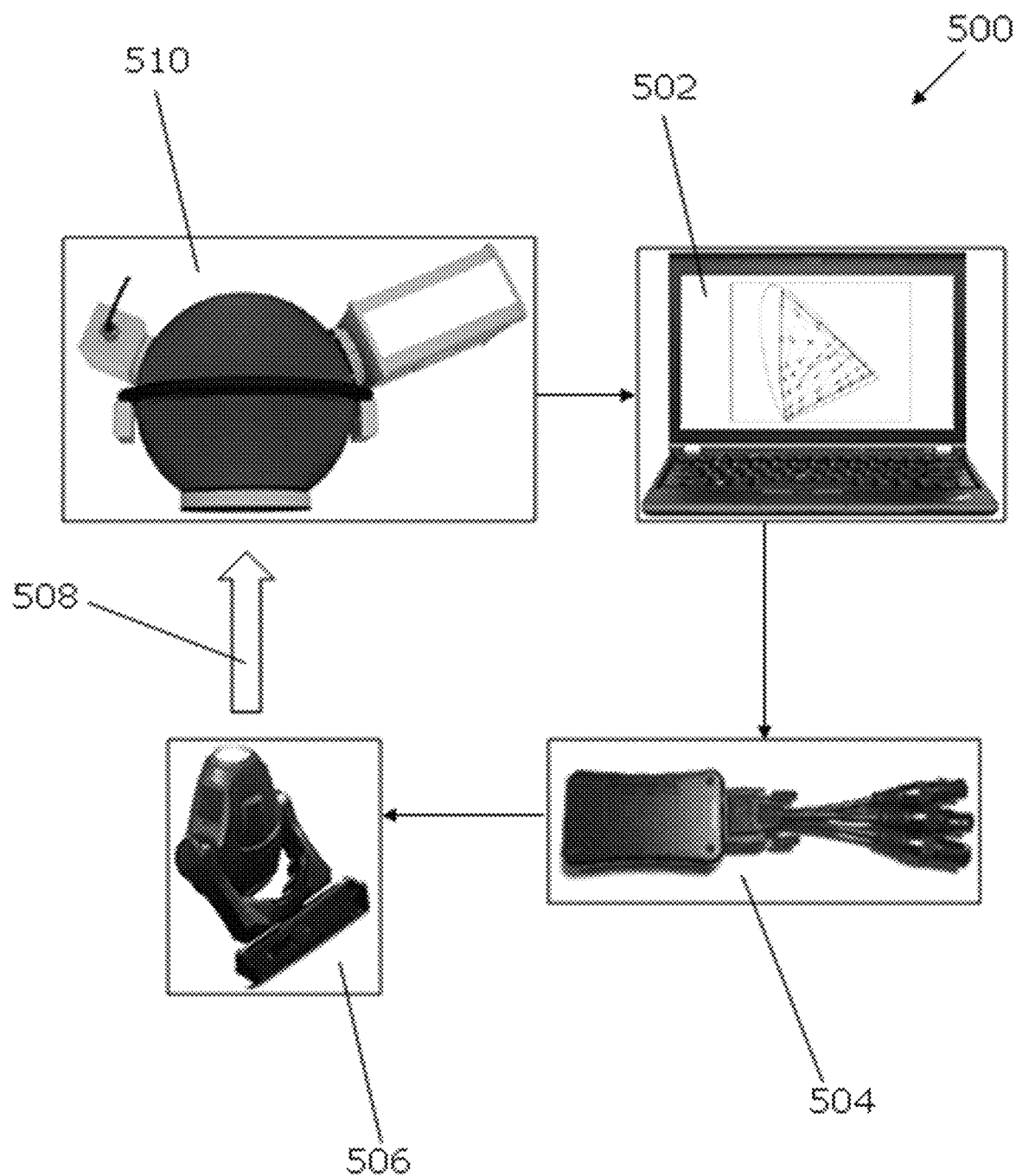
FIG. 5 shows an overview of a light fixture system.

FIG. 5 shows an overview of a light fixture system 500, said light fixture system comprising a light fixture comprising a light source, a subtractive color mixing system, wherein the subtractive color mixing system comprises a transducer for controlling the subtractive color filters upon receipt of target control setpoints, and a control device 502, wherein the control device is operationally connected to the subtractive color mixing system and arranged for controlling the subtractive color mixing system by outputting calculated target control setpoints to the transducer controlling respective subtractive color filters. In more detail, control device 502 sets and submits consecutively—via an interface 504, e.g., a USB-to-DMX interface (which is a serial digital interface adapter to connect a computer to one or more fixtures)—to a light fixture 506 sets of control setpoints for controlling each color filter of a subtractive color mixing system of the light fixture 506, whereupon the light fixture emits light 508 accordingly, and an integrating sphere 510 is arranged for receiving light 508 emitted from the light fixture. Software is thus used to control the light fixture 506 (through an interface 504) and measurement equipment such that the light spectrum is measured for a number of different configurations of the subtractive color filters. The measurements may form calibration measurements, are sent from the integrating sphere 510 to the control device 502, which can then determine colors and triangulate a color space accordingly. Subsequently, the control device can utilize the calibration data to (e.g., via a color engine algorithm) to determine one or more control setpoints that produces one or more target colors.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a light fixture with a subtractive color mixing system for emitting light having a target color, said method comprising:
  receiving target information indicative of the target color;
  calculating a target control setpoint for each of a plurality of subtractive color filters based on:
    the target information; and
    calibration data, which for a plurality of sets of calibration control setpoints is indicative of an emitted color, and
  controlling each of the subtractive color filters according to the calculated target control setpoint for each of the subtractive color filters.

2. The method according to claim 1, further comprising:
obtaining calibration data for one or more of the sets of calibration control setpoints, the obtaining of the calibration data comprising:
controlling each subtractive color filter according to a respective calibration control setpoint;
measuring a color of light emitted from the light fixture when each subtractive color filter is controlled according to the respective calibration control setpoint; and
storing corresponding values of:
the set of calibration control setpoints; and
the color of light emitted from the light fixture when each subtractive color filter is controlled according to the respective calibration control setpoint.

3. The method according to claim 1, further comprising:
obtaining calibration data for one or more of the sets of calibration control setpoints, the obtaining of the calibration data comprising:
controlling each subtractive color filter according to a respective calibration control setpoint;
measuring spectral information of light emitted from the light fixture when each subtractive color filter is controlled according to the respective calibration control setpoint; and
storing corresponding values of:
the set of calibration control setpoints; and
the spectral information of light emitted from the light fixture when each subtractive color filter is controlled according to the respective calibration control setpoint.

4. The method according to claim 1, wherein the calibration data comprises a number N of sets of calibration control setpoints, and wherein the number N is 2 or more.

5. The method according to claim 4, wherein the number N is 10 or more.

6. The method according to claim 4, wherein one or more of the sets of calibration control setpoints corresponds to substantially zero subtraction of light by the corresponding subtractive color filter.

7. The method according to claim 4, wherein the plurality of sets of calibration control setpoints comprises:
for one or more of the subtractive color filters, a set of calibration control setpoints which correspond to a substantially non-zero subtraction of light; and
for all other subtractive color filters, a set of calibration control setpoints which correspond to substantially zero subtraction of light.

8. The method according to claim 4, wherein the plurality of sets of calibration control setpoints comprises one or more sets of mixed calibration control setpoints having a plurality of calibration control setpoints that correspond to a substantially non-zero subtraction of light.

9. The method according to claim 4, wherein the plurality of sets of calibration control setpoints comprises a plurality of sets of mixed calibration control setpoints for which:
a plurality of calibration control setpoints each corresponds to a substantially non-zero subtraction of light; and
corresponding colors of light emitted from the light fixture according to the plurality of sets of mixed calibration control setpoints have different distances in a color space with respect to a color for each setpoint which corresponds to substantially zero subtraction of light by the corresponding subtractive color filter.

10. The method according to claim 9, wherein the color space is the CIE 1931 color space.

11. The method according to claim 9, wherein for the sets of mixed calibration control setpoints with corresponding emitted colors at different distances in a color space, two calibration control setpoints are substantially non-zero.

12. The method according to claim 11, wherein only the two calibration control setpoints of the sets of mixed calibration control setpoints are substantially non-zero.

13. The method according to claim 1, wherein calculating the target control setpoint for each of the subtractive color filters comprises interpolating between sets of calibration control setpoints.

14. A control device for controlling a subtractive color mixing system of a light fixture, wherein the subtractive color mixing system comprises a plurality of adjustable subtractive color filters, and wherein the control device is arranged for:
receiving target information indicative of the target color;
calculating a target control setpoint for each of the plurality of subtractive color filters based on:
the target information; and
calibration data, which for a plurality of sets of calibration control setpoints is indicative of an emitted color, and
outputting calculated target control setpoints enabling controlling each of the subtractive color filters according to each calculated target control setpoint for each of the subtractive color filters.

15. The control device according to claim 14, further being operationally connected to a storage unit comprising information corresponding to the calibration data.

16. The control device according to claim 15, wherein the control device comprises the storage unit.

17. A light fixture system comprising:
a light fixture comprising:
a light source;
a subtractive color mixing system, wherein the subtractive color mixing system comprises a transducer for controlling the subtractive color filters upon receipt of target control setpoints; and
a control device according to claim 14, wherein the control device is operationally connected to the subtractive color mixing system and arranged for controlling the subtractive color mixing system by outputting calculated target control setpoints to the transducer.

18. The light fixture system of claim 17 further comprising:
a meter selected from one of a color meter or a spectrometer, wherein the light fixture is arranged for emitting light to the meter, and wherein the control device is further arranged for obtaining calibration data for one or more of the sets of calibration control setpoints, the obtaining of the calibration data comprising:
controlling each subtractive color filter according to a respective calibration control setpoint;
measuring, with the meter, a parameter of light emitted from the light fixture when each subtractive color filter is controlled according to the respective calibration control setpoint, the parameter being selected from one of a color of light or spectral information of light; and
storing corresponding values of:
the calibration set of control setpoints; and
the parameter of light emitted from the light fixture when each subtractive color filter is controlled according to the set of calibration control setpoints.

19. The light fixture system of claim 17, wherein the control device is further arranged for obtaining calibration data in a calibration mode.

\* \* \* \* \*